UNITED STATES PATENT OFFICE.

HOMER ANDERSON, OF GARRATTSVILLE, NEW YORK.

IMPROVEMENT IN WELDING STEEL.

Specification forming part of Letters Patent No. 14,435, dated March 18, 1856.

*To all whom it may concern:*

Be it known that I, HOMER ANDERSON, of Garrattsville, in the town of New Lisbon, county of Otsego, State of New York, have invented a new and useful compound, properly termed a "flux," for use in welding pieces of metal or or uniting metallic surfaces; and I do hereby declare that the following is a full and exact description of said compound and of the manner of using the same, reference being had to the accompanying ingredients and compound, and to the letters marked thereon.

A is sulphate of soda. B is carbonate of soda. C is the compound formed from A B.

The compound consists of a certain quantity of sulphate of soda, by bulk one-half to the carbonate of soda, or, in other words, the compound consists of equal proportions of A and B, which may be commingled and mixed together in any way convenient and used as occasion may require. These articles are so well known (and most persons being well aware that they simply need to be rubbed up together in a mortar or by any other convenient means to make them into a compound) that it is not deemed necessary to make any more special statements of the method required to form the compound. When thus mixed up together and formed into the compound the compound is used by placing it upon the metal surfaces to be welded together in the same way and at the same time that the common and ordinary fluxes are now used.

I am aware that various alkaline solutions, both simple and compound, have been used as fluxes and soldering solutions, and I therefore thus limit my claim, viz:

What I claim as of my invention, and desire to secure by Letters Patent, is—

The compound of sulphate of soda and carbonate of soda made up and used for welding metallic surfaces, as herein set forth.

HOMER ANDERSON.

In presence of—
   SOLOMON DAVIS,
   D. C. DAVIS.